(12) United States Patent
Tanaka et al.

(10) Patent No.: US 10,625,431 B2
(45) Date of Patent: Apr. 21, 2020

(54) ROBOT AND METHOD FOR MOUNTING BALANCER TO ROBOT

(71) Applicant: KABUSHIKI KAISHA YASKAWA DENKI, Kitakyushu-shi (JP)

(72) Inventors: Kentaro Tanaka, Kitakyushu (JP); Ryuta Kagawa, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 249 days.

(21) Appl. No.: 15/068,956

(22) Filed: Mar. 14, 2016

(65) Prior Publication Data
US 2016/0271806 A1    Sep. 22, 2016

(30) Foreign Application Priority Data

Mar. 19, 2015    (JP) ................................ 2015-056433

(51) Int. Cl.
*B25J 19/00*    (2006.01)
*B25J 9/04*    (2006.01)

(52) U.S. Cl.
CPC .......... *B25J 19/0012* (2013.01); *B25J 9/047* (2013.01); *B25J 19/007* (2013.01); *Y10S 901/48* (2013.01)

(58) Field of Classification Search
CPC .................... B25J 19/0012; B25J 19/0008
See application file for complete search history.

(56) References Cited

U.S. PATENT DOCUMENTS 4,500,251 A  *  2/1985  Kiryu ....................... B25J 9/047
                                                              248/123.11
4,775,289 A  *  10/1988  Kazerooni ......... B23Q 11/0021
                                                              414/735
(Continued)

FOREIGN PATENT DOCUMENTS

CN    104070536 A    10/2014
JP    S9-115190 A    7/1984
(Continued)

OTHER PUBLICATIONS

Combined Office Action and Search Report dated Oct. 11, 2017 in Chinese Patent Application No. 201610153826.0 (with English language translation) citing reference AO therein, 15 pages.
(Continued)

*Primary Examiner* — William Kelleher
*Assistant Examiner* — Gregory T Prather
(74) *Attorney, Agent, or Firm* — Oblon, McClelland, Maier & Neustadt, L.L.P.

(57) ABSTRACT

A robot includes a robot arm, a balancer, and a first mounting portion and a second mounting portion. The balancer is pressurized in advance by a predetermined amount of pressure and contracted to a dimension smaller than a predetermined mounting dimension of the robot arm. The first mounting portion and the second mounting portion are disposed on the robot arm to respectively accept a first end and a second end of the balancer so that the first end and the second end of the balancer are mounted on the robot arm. At least one mounting portion among the first mounting portion and the second mounting portion accepts the corresponding end, among the first end and the second end, of the balancer in a direction approximately parallel to a direction in which the balancer is expanded and contracted.

20 Claims, 8 Drawing Sheets

(56) References Cited

U.S. PATENT DOCUMENTS

| | | | | |
|---|---|---|---|---|
| 5,332,181 | A * | 7/1994 | Schweizer | A61B 6/4405 248/123.11 |
| 6,145,403 | A * | 11/2000 | Aschenbrenner | B25J 19/0008 361/144 |
| 2007/0265731 | A1 * | 11/2007 | Merk | B25J 9/102 700/245 |
| 2008/0210477 | A1 * | 9/2008 | Takenaka | B25J 19/0012 180/8.6 |
| 2010/0212305 | A1 * | 8/2010 | Runesson | B25J 19/0012 60/327 |
| 2011/0072930 | A1 * | 3/2011 | Bayer | B25J 19/0012 74/490.01 |
| 2011/0320038 | A1 * | 12/2011 | Motoki | B25J 19/0008 700/245 |
| 2012/0186379 | A1 * | 7/2012 | Miyamoto | B25J 19/0012 74/490.01 |
| 2012/0186380 | A1 * | 7/2012 | Yamada | B25J 19/0012 74/490.01 |
| 2013/0187022 | A1 * | 7/2013 | Duportal | G01B 5/008 248/543 |
| 2014/0290414 | A1 * | 10/2014 | Hasuo | B25J 19/0012 74/490.01 |
| 2014/0297037 | A1 * | 10/2014 | Hayashi | B25J 19/0012 700/258 |
| 2015/0174770 | A1 * | 6/2015 | Kagawa | B25J 19/0008 74/490.01 |
| 2016/0325441 | A1 * | 11/2016 | Harada | B25J 19/0012 |

FOREIGN PATENT DOCUMENTS

| | | |
|---|---|---|
| JP | 60-20891 A | 2/1985 |
| JP | 1-295787 A | 11/1989 |
| JP | 11-216697 A | 8/1999 |
| JP | 11-262889 A | 9/1999 |
| JP | 2012-148392 A | 8/2012 |
| JP | 2014-195854 A | 10/2014 |

OTHER PUBLICATIONS

Japanese Office Action dated Dec. 19, 2017 in Japanese Patent application No. 2015-056433 (with unedited computer generated English translation), citing documents AO through AS therein, 8 pages.

Extended European Search Report dated Nov. 8, 2016 in Patent Application No. 16157493.4.

Chinese Office Action dated May 3, 2018 in Chinese Patent Application No. 201610153826.0 (with English translation), 14 pages.

Office Action dated Nov. 7, 2018 in corresponding EP Application No. 16157493.4 filed Feb. 26, 2016, citing document AA therein, 5 pages.

Office Action dated Aug. 19, 2019 in European Patent Application No. 16157493.4.

* cited by examiner

ROBOT AND METHOD FOR MOUNTING BALANCER TO ROBOT

CROSS-REFERENCE TO RELATED APPLICATIONS

The present application claims priority under 35 U.S.C. § 119 to Japanese Patent Application No. 2015-056433, filed Mar. 19, 2015. The contents of this application are incorporated herein by reference in their entirety.

BACKGROUND

Field of the Invention

The embodiments disclosed herein relate to a robot and a method for mounting a balancer to a robot.

Discussion of the Background

Japanese Unexamined Patent Application Publication No. 2012-148392 discloses a robot that includes a base and a robot arm. The base is disposed on an installation surface such as a floor surface. The robot arm is turnably and swingably coupled to the base. The robot includes a gravity compensation balancer to reduce load attributed to gravity acting on a motor, a reducer, and other elements that cause the robot arm to swing.

The balancer is a fluid-pressure balancer, which utilizes pressure of a fluid such as gas. Fluid-pressure balancers have come into use considering their contributions to size reductions in comparison with spring balancers, which are more widely known as balancers.

SUMMARY

According to one aspect of the present disclosure, a robot includes a robot arm, a balancer, and a first mounting portion and a second mounting portion. The balancer is pressurized in advance by a predetermined amount of pressure and contracted to a dimension smaller than a predetermined mounting dimension of the robot arm. The first mounting portion and the second mounting portion are disposed on the robot arm to respectively accept a first end and a second end of the balancer so that the first end and the second end of the balancer are mounted on the robot arm. At least one mounting portion among the first mounting portion and the second mounting portion accepts the corresponding end, among the first end and the second end, of the balancer in a direction approximately parallel to a direction in which the balancer is expanded and contracted.

According to another aspect of the present disclosure, a method is for mounting a balancer to a robot. The robot includes a robot arm, a balancer, and a first mounting portion and a second mounting portion. The balancer is pressurized in advance by a predetermined amount of pressure and contracted to a dimension smaller than a predetermined mounting dimension of the robot arm. The first mounting portion and the second mounting portion are disposed on the robot arm to respectively accept a first end and a second end of the balancer so that the first end and the second end of the balancer are mounted on the robot arm. At least one mounting portion among the first mounting portion and the second mounting portion accepts the corresponding end, among the first end and the second end, of the balancer in a direction approximately parallel to a direction in which the balancer is expanded and contracted. The method includes mounting the first end of the balancer to the first mounting portion in the direction approximately parallel to the direction in which the balancer is expanded and contracted.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

A robot according to an embodiment and a method according to an embodiment for mounting a balancer to the robot will be described in detail by referring to the accompanying drawings. It is noted that the following embodiments are provided for exemplary purposes only and are not intended in a limiting sense.

Figure 1:
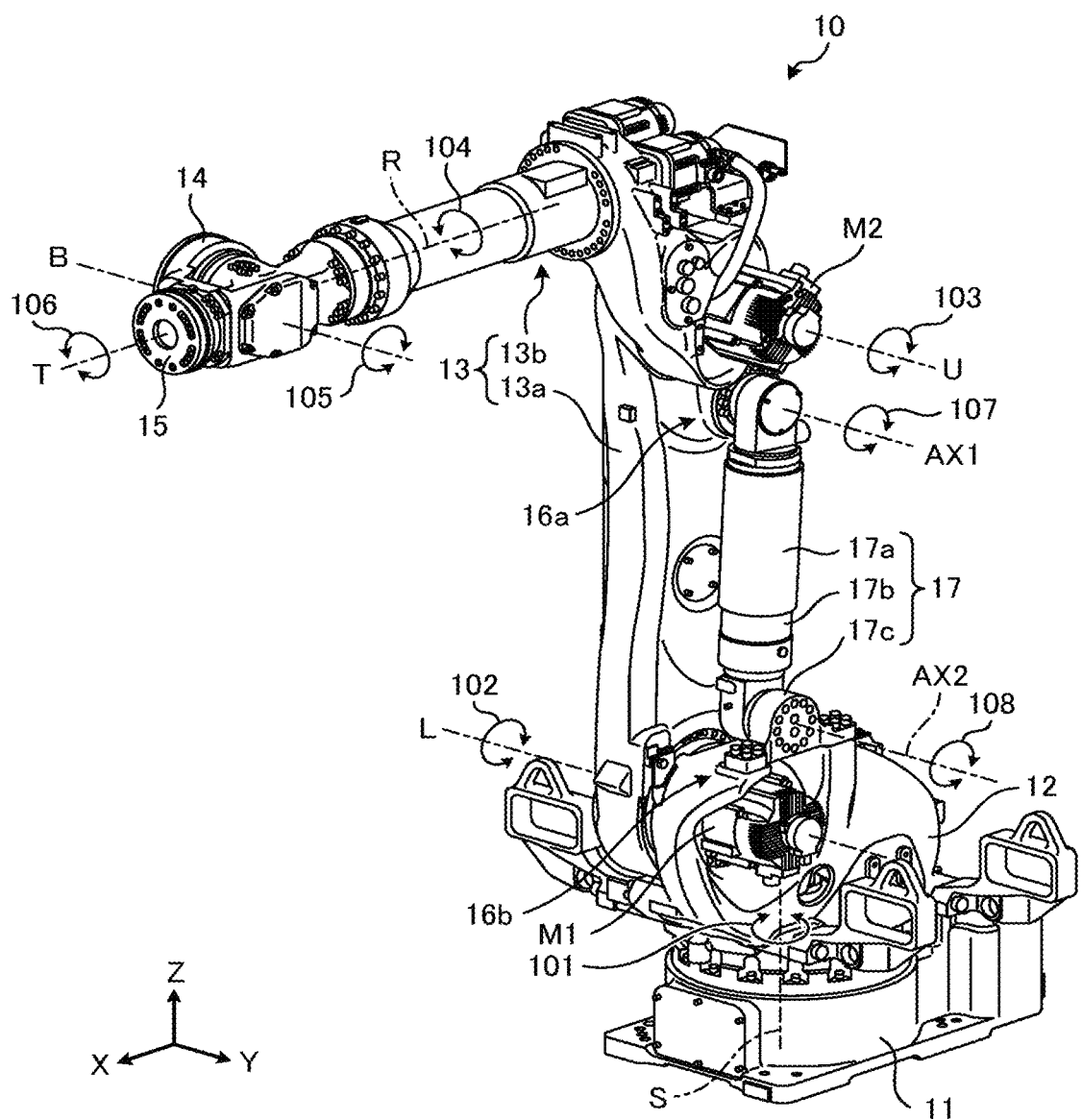
FIG. 1 is a perspective view of a robot according to an embodiment.

First, a configuration of a robot 10 according to this embodiment will be described. FIG. 1 is a perspective view of the robot 10 according to this embodiment. For convenience of description, the positions of the components of the robot 10 relative to each other will be described under the assumption that the turning position and posture of the robot 10 are basically as illustrated in FIG. 1.

The side of the surface on which a base 11 of the robot 10 is installed will be referred to as "base end side". A portion of each of the components of the robot 10 on and around the base end side of each component will be referred to as "base end portion". The flange 15 side of the robot 10 will be referred to as "distal end side". A portion of each of the components of the robot 10 on and around the distal end side of each component will be referred to as "distal end portion".

For the ease of description, FIG. 1 illustrates a three-dimensional orthogonal coordinate system including a Z axis with its vertically upward direction being assumed the positive direction. This orthogonal coordinate system may also be illustrated in some other drawings referred to in the following description. In this embodiment, the front of the robot 10 faces the positive direction of an X axis.

As illustrated in FIG. 1, the robot 10 is what is called a serial link vertical multi-articular robot, and includes six rotary joint axes, namely, an axis S, an axis L, an axis U, an axis R, an axis B, and an axis T.

The robot 10 includes the base 11, a turnable base 12, an arm 13, a wrist 14, and the flange 15. The arm 13 includes a lower arm 13a and an upper arm 13b.

The base 11 is a support base installed on an installation surface such as a floor surface. The turnable base 12 is coupled to the base 11 and turnable about the axis S, which is approximately perpendicular to the installation surface (see arrows 101 in FIG. 1).

The lower arm 13a is coupled to the turnable base 12 and has a base end portion turnable about the axis L, which is approximately perpendicular to the axis S (see arrows 102 in FIG. 1). The lower arm 13a is turned about the axis L by a turning driver M1. The turning driver M1 is disposed at a distal end portion of the turnable base 12 and is crossed by the axis L.

The upper arm 13b is coupled to a distal end portion of the lower arm 13a and has a base end portion turnable about the axis U, which is approximately parallel the axis L (see arrows 103 in FIG. 1). The upper arm 13b is turned about the axis U by a turning driver M2. The turning driver M2 is disposed at a base end portion of the upper arm 13b and is crossed by the axis U. The upper arm 13b is also turnable about the axis R, which is approximately perpendicular to the axis U (see arrows 104 in FIG. 1).

The wrist 14 is coupled to a distal end portion of the upper arm 13b and turnable about the axis B, which is approximately perpendicular to the axis R (see arrows 105 in FIG. 1). The flange 15 is coupled to the wrist 14 and turnable about the axis T, which is approximately perpendicular to the axis B (see arrows 106 in FIG. 1). An end effector is attachable to the flange 15. A non-limiting example of the end effector is a spot welding gun, which may be used when the robot 10 is dedicated to spot welding.

In this embodiment, the term "robot arm" refers to a combination of the turnable base 12, the arm 13, the wrist 14, and the flange 15 that is movable relative to the base 11.

The robot 10 includes a first mounting portion 16a, a second mounting portion 16b, and a balancer 17. The balancer 17 compensates for gravity involved in a displacement from a neutral posture, described later, to reduce load on the turning driver M1.

The balancer 17 includes a cylinder 17a and a rod 17b. The cylinder 17a contains a fluid such as nitrogen gas. The rod 17b is expanded and contracted under pressure of the fluid. That is, the balancer 17 is a fluid-pressure balancer. Other examples of the fluid in the cylinder 17a include, but are not limited to, other kinds of gas, a liquid such as oil, and a mixture of gas and liquid. The balancer 17 also includes a balancer end material 17c. The balancer end material 17c will be described in detail later by referring to FIG. 3B and later drawings.

The first mounting portion 16a and the second mounting portion 16b each are a mechanism to mount the balancer 17. The first mounting portion 16a is disposed at the distal end portion of the lower arm 13a and is closer to a base end portion of the lower arm 13a than the turning driver M2 is to the base end portion of the lower arm 13a. The first mounting portion 16a supports one end of the balancer 17 in a turnable manner about an axis AX1 (first turning axis) (see arrows 107 in FIG. 1).

The second mounting portion 16b is disposed at a distal end portion of the turnable base 12 and above the turning driver M1. The second mounting portion 16b supports the other end of the balancer 17 in a turnable manner about an axis AX2 (second turning axis) (see arrows 108 in FIG. 1).

That is, the balancer 17 is disposed across the distal end portion of the lower arm 13a and the distal end portion of the turnable base 12. The first mounting portion 16a and the second mounting portion 16b will be hereinafter occasionally referred to as "mounting portion 16" collectively.

In this embodiment, the balancer 17 is what is called a "pull type" balancer. The term "pull type" refers to such a type that when the rod 17b is expanded from the cylinder 17a with the cylinder 17a pressurized by a predetermined amount of pressure, the rod 17b is urged by the pressure of the fluid to be contracted into the cylinder 17a.

The balancer 17 is smaller in total length in the directions in which the balancer 17 is expanded and contracted than what is called a "push type" balancer, which makes opposite movements to the movements that the "pull type" balancer 17 makes. Therefore, the use of the "pull type" balancer 17 contributes to realization of a compact design of the robot 10.

If the "push type" balancer is used, the "push type" balancer expands in opposite directions to the directions in which the "pull type" balancer 17 expands when the balancer is in its natural state of being pressurized. This necessitates a larger total length in the expansion directions and may result in such a configuration that the second mounting portion 16b is disposed at a position that is closer to a base end portion of the turnable base 12 than the turning driver M1 is to the base end portion of the turnable base 12 while at the same time the second mounting portion 16b and the turning driver M1 do not interfere with each other. Thus, it is less likely that the "push type" balancer contributes to realization of a compact design of the robot 10.

As described above, in the "pull type" balancer 17, the second mounting portion 16b is disposed at the distal end portion of the turnable base 12 and above the turning driver M1. This configuration eliminates or minimizes enlargement of the turnable base 12. Thus, the "pull type" balancer 17 contributes to realization of a compact design of the robot 10.

Figure 2A:
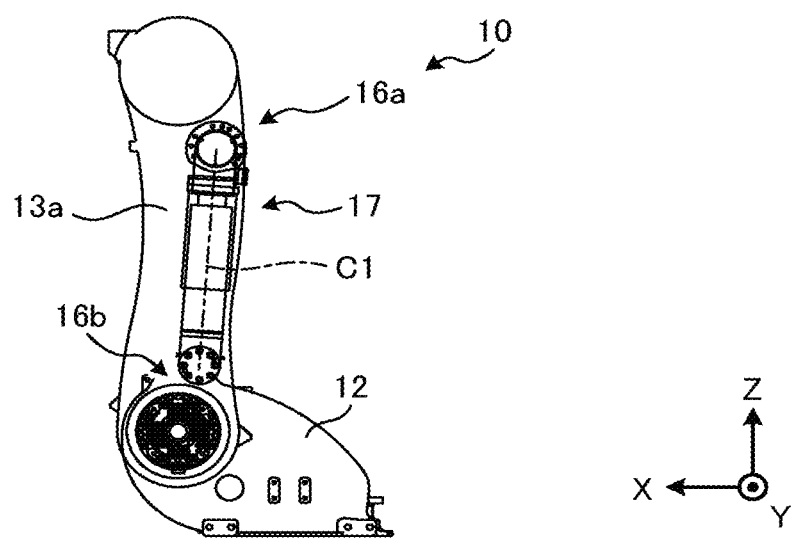
FIG. 2A is a first illustration of movement of a balancer.
Figure 2B:
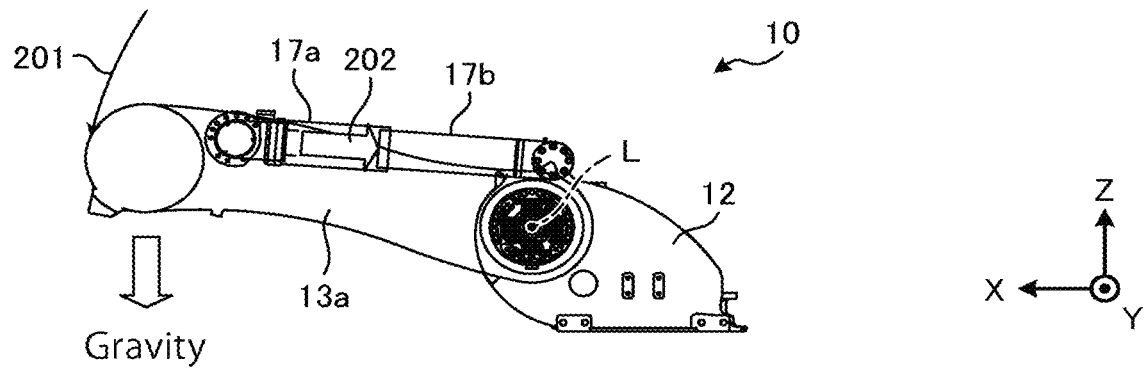
FIG. 2B is a second illustration of the movement of the balancer.
Figure 2C:
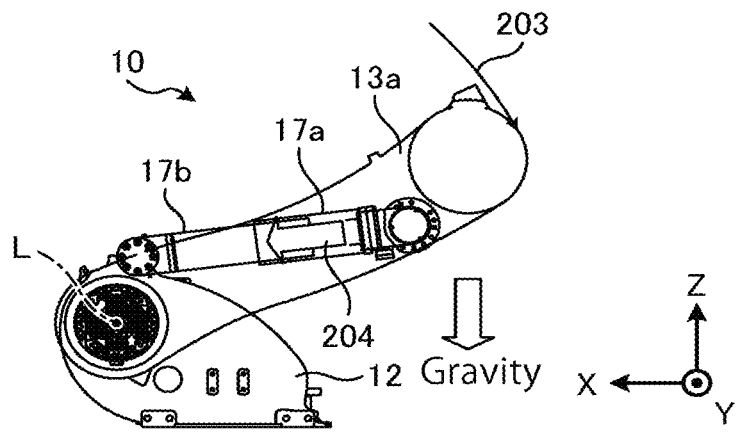
FIG. 2C is a third illustration of the movement of the balancer.

Next, how the "pull type" balancer 17 moves in the robot 10 according to this embodiment will be described by referring to FIGS. 2A to 2C. FIGS. 2A to 2C are first to third illustrations of how the balancer 17 moves. For convenience of description, FIGS. 2A to 2C only illustrate the turnable base 12, the lower arm 13a, and related elements.

In FIG. 2A, the robot 10 is in its neutral state, that is, keeps its balance with the lower arm 13a of the robot 10 standing approximately perpendicularly. This posture of the robot 10 is defined as "neutral posture". The balancer 17 has its one end mounted on the first mounting portion 16a and the other end mounted on the second mounting portion 16b. In the neutral posture, the balancer 17 keeps its axis line C1 approximately parallel to the vertical direction and keeps a balance between expansion and contraction.

Then, as illustrated in FIG. 2B, assume that the lower arm 13a turns about the axis L and thus the robot 10 takes what can be called a "forward-tilted posture" (see arrow 201 in FIG. 2B). The forward-tilted posture of the robot 10 causes the rod 17b of the balancer 17 to expand from the cylinder 17a. Since the balancer 17 is of the "pull type", the rod 17b is inclined to contract so as to offset the expansion, that is, pulls the lower arm 13a in the arrow 202 direction against gravity. This ensures that gravitational moment acting on the axis L in the forward-tilted posture of the robot 10 is supported.

As illustrated in FIG. 2C, assume that the lower arm 13a turns about the axis L and thus the robot 10 takes what can be called a "rearward-tilted posture" (see arrow 203 in FIG. 2C). Similarly to the forward-tilted posture of the robot 10, the rearward-tilted posture of the robot 10 causes the rod 17b of the balancer 17 to expand from the cylinder 17a. Since the balancer 17 is of the "pull type", the rod 17b is inclined to contract so as to offset the expansion, that is, pulls the lower arm 13a in the arrow 204 direction against gravity. This ensures that gravitational moment acting on the axis L in the rearward-tilted posture of the robot 10 is supported.

It is noted that in order to make these movements of the "pull type" balancer 17 smoother, a possible embodiment is to mount the balancer 17 to the robot 10 with the balancer 17 slightly expanded from fully contracted state, because in fully contracted state, more powerful thrust is needed in expanding the rod 17b.

A technique employed in a comparative example is to make the rod 17b into free state by removing the fluid out of the balancer 17 and adjust the length of the balancer 17 to accord with a predetermined mounting dimension. Thus, this technique involves a complicated procedure. Additionally, this technique is more costly in that dedicated equipment is necessary for removing the fluid and then refilling the balancer 17.

In view of this technique, in this embodiment, the balancer 17 is mounted to the robot 10 with the balancer 17 being pressurized by a predetermined amount of pressure and contracted to a dimension smaller than a predetermined mounting dimension of the robot arm. This configuration reduces the cost of mounting the balancer 17 to the robot 10.

Also in this embodiment, at least one end, among the one end and the other end, of the balancer 17 with the decreased dimension is mounted to the mounting portion 16 in a direction approximately parallel to the directions in which the balancer 17 is expanded and contracted. In other words, by mounting at least one end of the balancer 17 to the mounting portion 16, a force acts in the direction approximately parallel to the directions in which the balancer 17 is expanded and contracted, and a mechanism that utilizes the force to expand the balancer 17 is provided.

Figure 3A:
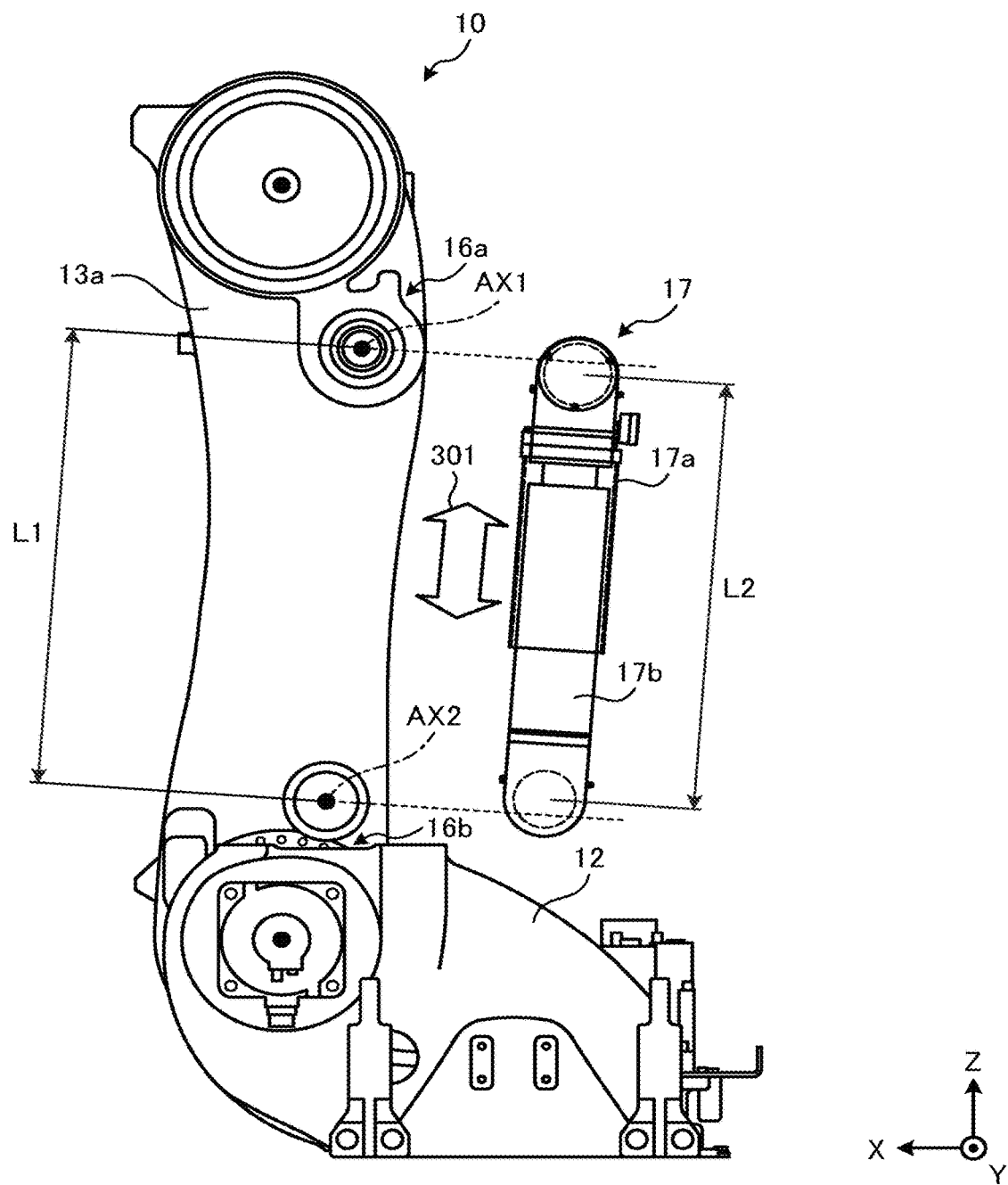
FIG. 3A is a first illustration of a method according to an embodiment for mounting the balancer to the robot.
Figure 3B:
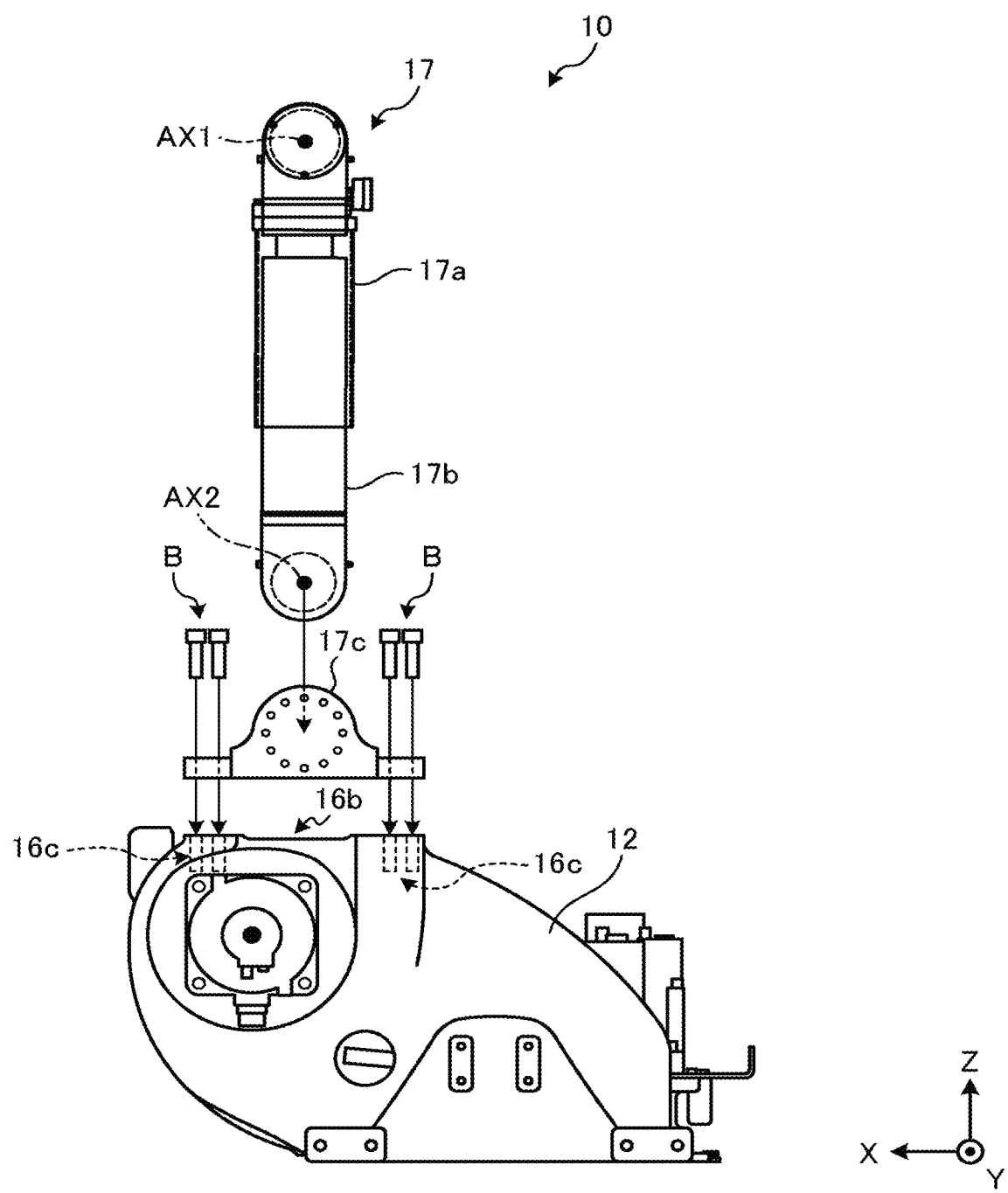
FIG. 3B is a second illustration of the method according to the embodiment for mounting the balancer to the robot.
Figure 3C:
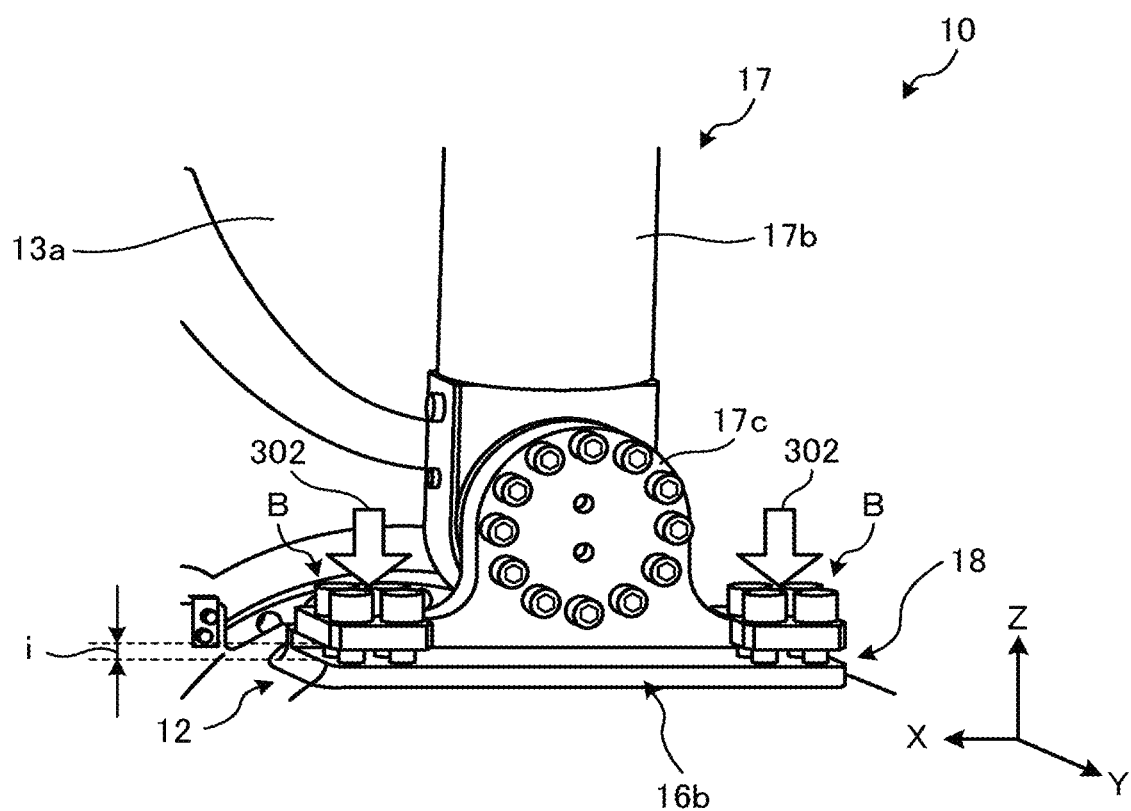
FIG. 3C is a third illustration of the method according to the embodiment for mounting the balancer to the robot.

A method according to this embodiment for mounting the balancer 17 to the robot 10 will be described in more detail by referring to FIGS. 3A to 3C. FIGS. 3A to 3C are first to third illustrations of method for mounting the balancer 17 to the robot 10 according to this embodiment.

In FIG. 3A, the balancer 17 is yet to be mounted to the robot 10. As described above, in the balancer 17 in this state, the rod 17b is contracted into the cylinder 17a and has a dimension of L2, which is smaller than predetermined mounting dimension L1, which is the distance between the axis AX1 and the axis AX2.

In order to mount the balancer 17 in this state without removing the fluid out of the balancer 17, it is necessary to effect a force in approximately parallel at least to the directions in which the balancer 17 is expanded and contracted so as to expand the balancer 17 to the predetermined mounting dimension L1 (see arrows 301 in FIG. 3A).

In view of this necessity, in the robot 10 according to this embodiment, the second mounting portion 16b, which is at the distal end portion of the turnable base 12, accepts the other end of the balancer 17, which on the axis AX2 side, in the direction approximately parallel to the directions in which the balancer 17 is expanded and contracted.

Specifically, as illustrated in FIG. 3B, the second mounting portion 16b includes holes 16c. The holes 16c are formed in the direction approximately parallel to the directions in which the balancer 17 is expanded and contracted. Providing the holes 16c ensures that the axis AX2 side of the balancer 17 is mounted in the direction approximately parallel to the directions in which the balancer 17 is expanded and contracted.

The axis AX2 is approximately perpendicular to the directions in which the balancer 17 is expanded and contracted. In view of this, first, the balancer 17 according to this embodiment supports, at the balancer end material 17c (see FIGS. 1, 3B, and 3C), the axis AX2 side end of the balancer 17 in a turnable manner about the axis AX2.

Then, bolts B are inserted through holes (not illustrated) of the balancer end material 17c into the holes 16c of the second mounting portion 16b. The holes (not illustrated) of the balancer end material 17c are approximately perpendicular to the axis AX2. Then, the bolts B are tightened in the holes 16c. Thus, the balancer 17 is mounted to the second mounting portion 16b in the direction approximately parallel to the directions in which the balancer 17 is expanded and contracted.

A prerequisite to this manner of mounting the axis AX2 side end of the balancer 17 in the direction approximately parallel to the directions in which the balancer 17 is expanded and contracted is that at least the one end of the balancer 17, which is on the axis AX1 side, is already mounted on the first mounting portion 16a.

A structure of the second mounting portion 16b will be described in more detail under the assumption that the prerequisite is met. With the axis AX1 side end of the balancer 17 mounted on the first mounting portion 16a, there is a predetermined length of gap i defined between the second mounting portion 16b and the balancer end material 17c coupled to the rod 17b, as illustrated in FIG. 3C. In other words, the balancer 17 pressurized by a predetermined amount of pressure has a natural length that falls short of the second mounting portion 16b by a length equivalent to the gap i.

By tightening the bolts B, the second mounting portion 16b generates a connection force in the direction approximately parallel to the directions in which the balancer 17 is expanded and contracted so as to fill the gap i (see arrows 302 in FIG. 3C). Thus, the balancer 17 is expanded in the directions in which the balancer 17 is expanded and contracted.

Thus, the balancer 17 is expanded in a simpler manner, specifically, by the tightening of the bolts B, which are examples of the connection member, and is mounted to the robot 10. Otherwise, the "pull type" balancer 17 requires more powerful thrust to expand. That is, the balancer 17 is more readily mounted to the robot 10.

Additionally, with the bolts B used for the connections, it is easier to adjust the amount of tightening of the connection members. The facilitated adjustment is advantageous in particular when, for example, the fluid contained in the balancer 17 is slightly degraded, leading to a slight change in strength of expansion and contraction and making it necessary to finely adjust the balancer 17.

The structure illustrated in FIG. 3C can be rephrased as stating that the second mounting portion 16b includes a connection mechanism, 18, to generate a connection force that is in the direction approximately parallel to the directions in which the balancer 17 is expanded and contracted and that acts to fill the gap i.

The connection mechanism 18 will not be limited to the connection members described above. Another possible example of the connection mechanism 18 is that the second mounting portion 16b and the balancer end material 17c have flanges with the gap i between the flanges, and the flanges are clamped together by utilizing the law of the lever or some other means so as to fill the gap i.

The bolts B have been described as being inserted from the balancer 17 side toward the turnable base 12 and connecting the axis AX2 side end of the balancer 17 to the second mounting portion 16*b*, which is at the turnable base 12. This manner of connection is advantageous in mountability. Another possible embodiment is to insert the bolts B from the turnable base 12 side toward the balancer 17 and tighten the bolts B.

The posture that the robot 10 takes when the balancer 17 is mounted to the robot 10 is the neutral posture illustrated in FIG. 2A or may be any other posture that makes the axis line C1 of the balancer 17 approximately parallel to the vertical direction. This posture improves mounting workability in that in the expanding work of the balancer 17, gravity acts in approximately parallel to the directions in which the balancer 17 is expanded and contracted.

In order to utilize gravity in this manner and improve workability, in the above-described embodiment, the other end of the balancer 17 is mounted to the second mounting portion 16*b*, which is on the turnable base 12 side, in the direction approximately parallel to the directions in which the balancer 17 is expanded and contracted. Performing the mounting work at the turnable base 12 is advantageous in particular when the robot 10 is comparatively large and has a substantial height, since the turnable base 12 is closer to the base 11.

Figure 4A:
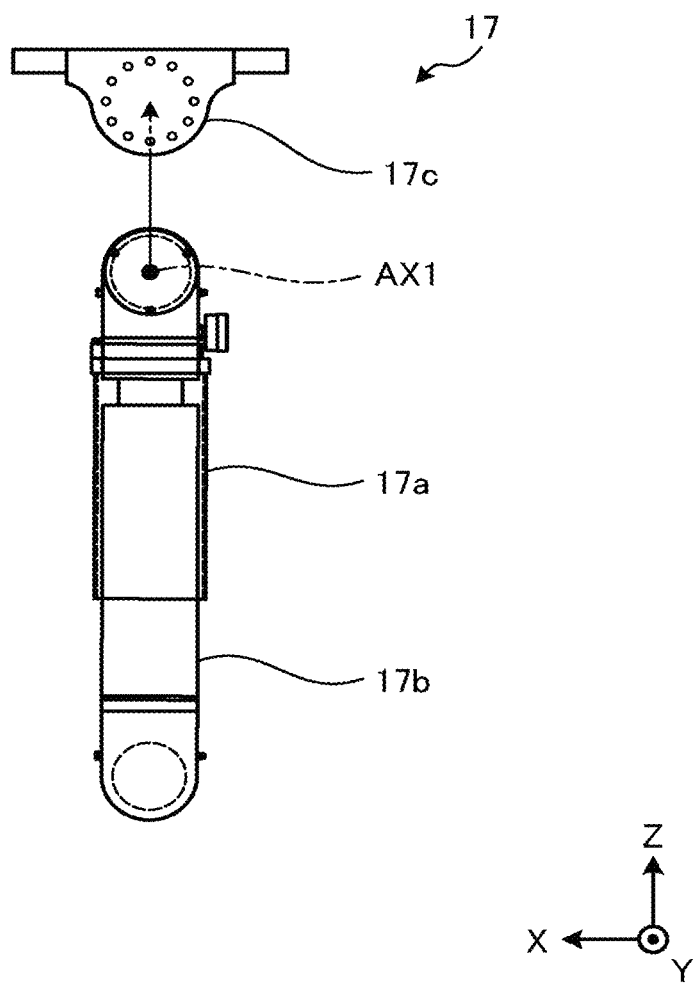
FIG. 4A is a first illustration of a method according to a modification for mounting the balancer to the robot.
Figure 4B:
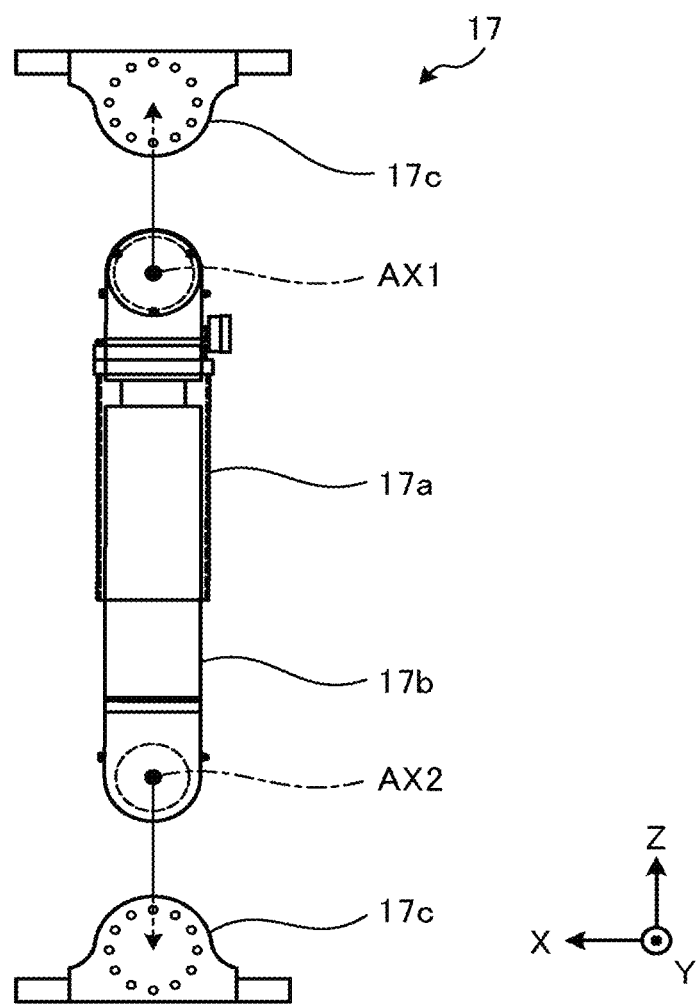
FIG. 4B is a second illustration of the method according to the modification for mounting the balancer to the robot.

The turnable base 12, of course, should not be construed as limiting where to mount one end of the balancer 17 in the direction approximately parallel to the directions in which the balancer 17 is expanded and contracted. Modifications will be described by referring to FIGS. 4A and 4B. FIGS. 4A and 4B are first and second illustrations of the method according to the modifications for mounting the balancer to the robot.

As illustrated in FIG. 4A, the balancer end material 17*c* is disposed on the axis AX1 side. In this case, a prerequisite is that the axis AX2 side of the balancer 17 is already mounted.

As illustrated in FIG. 4B, a balancer end material 17*c* is disposed on the axis AX1 side and another balancer end material 17*c* is disposed on the axis AX2 side. In this case, whichever balancer end material 17*c*, the axis AX1 side or the axis AX2 side, may be mounted first.

Figure 5:
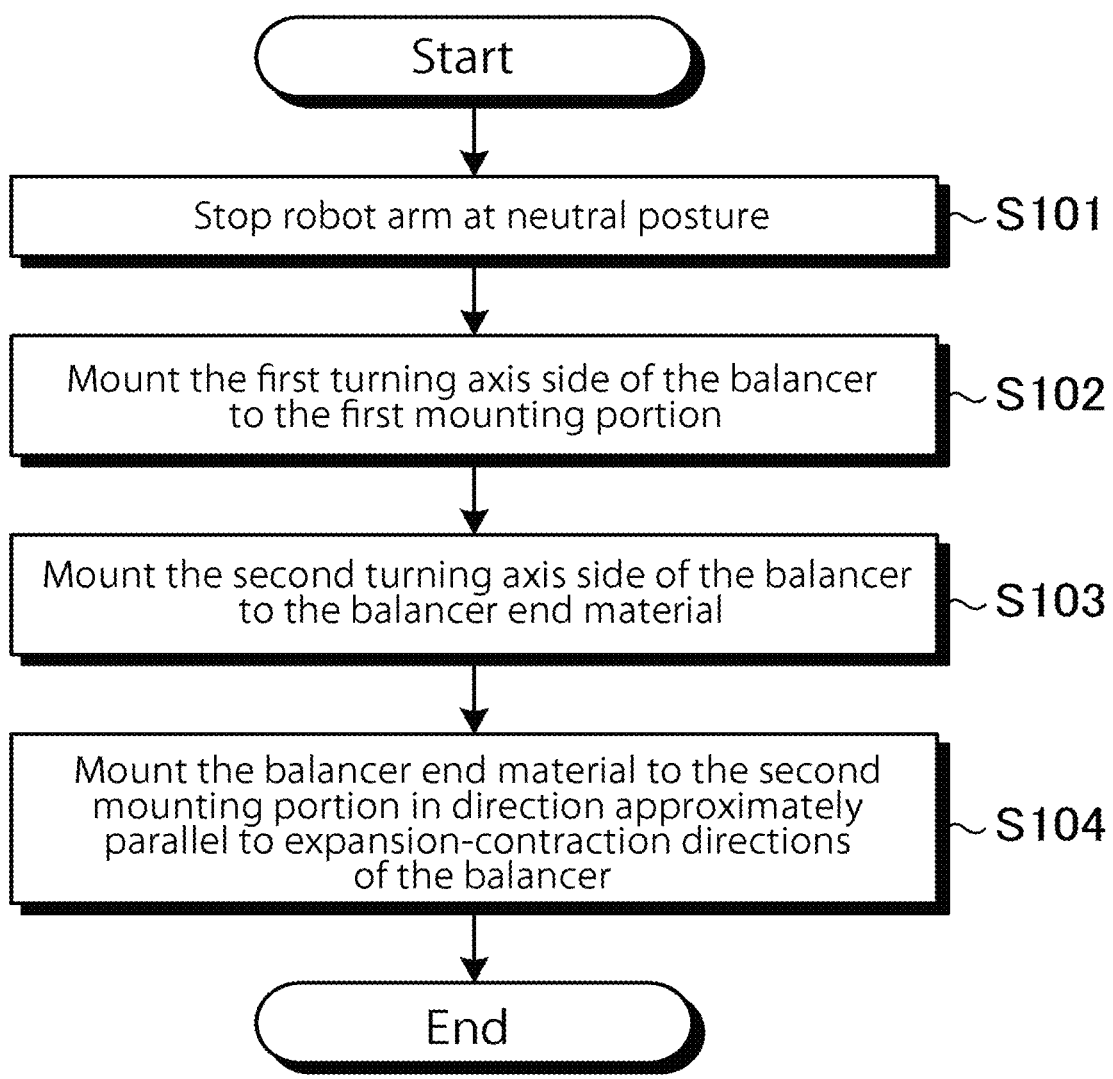
FIG. 5 is a flowchart of a processing procedure for the method according to the embodiment for mounting the balancer to the robot.

Next, description will be made with regard to a processing procedure for a method for mounting the balancer 17 to the robot 10 according to this embodiment. FIG. 5 is a flowchart of the processing procedure for the method according to this embodiment for mounting the balancer 17 to the robot 10. As described in FIG. 5, the robot 10 is in its neutral posture and the balancer end material 17*c* is disposed on the axis AX2 side alone.

First, the robot arm is made to stop at neutral posture (step S101). Then, the axis AX1 (first turning axis) side of the balancer 17 is mounted to the first mounting portion 16*a* (step S102).

Then, the axis AX2 (second turning axis) side of the balancer 17 is mounted to the balancer end material 17*c* (step S103).

Then, the balancer end material 17*c* is mounted to the second mounting portion 16*b* in a direction approximately parallel to the directions in which the balancer 17 is expanded and contracted (step S104), and the processing ends.

As has been described hereinbefore, the robot according to this embodiment includes a robot arm, a balancer, and a first mounting portion and a second mounting portion. The balancer is pressurized in advance by a predetermined amount of pressure and contracted to a dimension smaller than a predetermined mounting dimension of the robot arm. The first mounting portion and the second mounting portion are disposed on the robot arm to respectively accept a first end and a second end of the balancer so that the first end and the second end of the balancer are mounted on the robot arm. At least one mounting portion among the first mounting portion and the second mounting portion accepts the corresponding end, among the first end and the second end, of the balancer in a direction approximately parallel to a direction in which the balancer is expanded and contracted.

Thus, the robot according to this embodiment improves readiness of mounting the balancer to the robot.

In the above-described embodiment, the balancer has been described as being disposed across the turnable base and the lower arm. This, however, should not be construed in a limiting sense. Another possible embodiment is that the balancer is disposed across the lower arm and the upper arm.

In the above-described embodiment, the second mounting portion is disposed at the distal end portion of the turnable base and above the turning driver (M1). The first mounting portion is disposed at the distal end portion of the lower arm and is closer to the base end portion of the lower arm than the turning driver (M2) is to the base end portion of the lower arm. This, however, should not be construed as limiting the positions of the first mounting portion and the second mounting portion.

Another possible embodiment is that with the balancer disposed across the turnable base and the lower arm, the first mounting portion and the second mounting portion are disposed at such positions that the balancer pulls the lower arm from behind the robot.

In the above-described embodiment, the robot has been described as a six-axis robot, which has six axes. This, however, should not be construed as limiting the number of the axes. Another possible embodiment is that the robot is a seven-axis robot.

In the above-described embodiment, the robot has been described as a single-arm robot. This, however, should not be construed in a limiting sense. The above-described embodiment is also applicable to a two-arm robot or a multi-arm robot.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot comprising:
    a robot arm;
    a balancer comprising a rod and a cylinder such that a fluid in the cylinder urges the rod to contract into the cylinder in a longitudinal direction of the balancer;
    a first mounting portion mounting a first end of the balancer to the robot arm; and
    a second mounting portion mounting a second end of the balancer to the robot arm,
    wherein the second mounting portion comprises a connection mechanism generating a connection force in a direction approximately parallel to the longitudinal direction of the balancer such that the connection force is urging the rod to expand to a mounted length of the balancer in the longitudinal direction of the balancer.

2. The robot according to claim 1, wherein the connection mechanism comprises a connection member generating the connection force in the direction approximately parallel to the longitudinal direction.

3. The robot according to claim 2, wherein the robot arm has a hole structure oriented in the direction approximately parallel to the longitudinal direction of the balancer such that the connection member engages with the hole structure formed in the robot arm.

4. The robot according to claim 3, further comprising: a base configured to be placed on an installation surface, wherein the robot arm comprises a turnable base coupled to the base and configured to turn about a first turning axis approximately perpendicular to the installation surface, an arm coupled to the turnable base and comprising a base end portion configured to turn about a second turning axis approximately perpendicular to the first turning axis, and a turning driver disposed at the turnable base and comprising the second turning axis to turn the arm, the second end of the balancer is mounted on the turnable base, and the first end of the balancer is mounted on the arm.

5. The robot according to claim 4, wherein the second mounting portion is on a side of the turnable base and is disposed at a distal end portion of the turnable base and above the turning driver.

6. The robot according to claim 5, wherein the connection mechanism comprises the connection member fitted in the hole structure from a side of the balancer and to the side of the turnable base such that the second end of the balancer and the turnable base are connected to each other.

7. The robot according to claim 4, wherein the connection mechanism comprises the connection member fitted in the hole structure from a side of the balancer and to the side of the turnable base such that the second end of the balancer and the turnable base are connected to each other.

8. The robot according to claim 4, wherein the second mounting portion is mounted at a distal end portion of the turnable base and above the turning driver.

9. The robot according to claim 8, wherein the connection mechanism comprises the connection member fitted in the hole structure from a side of the balancer and to the side of the turnable base such that the second end of the balancer and the turnable base are connected to each other.

10. The robot according to claim 8, wherein the connection mechanism comprises a bolt device generating the connection force in the direction approximately parallel to the longitudinal direction of the balancer.

11. The robot according to claim 10, wherein the robot arm has a hole structure oriented in the direction approximately parallel to the longitudinal direction of the balancer such that the bolt device engages with the hole structure formed in the robot arm.

12. The robot according to claim 1, wherein the connection mechanism comprises a bolt device providing the connection force in the direction approximately parallel to the longitudinal direction of the balancer.

13. The robot according to claim 12, wherein the robot arm has a hole structure oriented in the direction approximately parallel to the longitudinal direction of the balancer such that the bolt device engages with the hole structure formed in the robot arm.

14. The robot according to claim 13, further comprising: a base configured to be placed on an installation surface, wherein the robot arm comprises a turnable base coupled to the base and configured to turn about a first turning axis approximately perpendicular to the installation surface, an arm coupled to the turnable base and comprising a base end portion configured to turn about a second turning axis approximately perpendicular to the first turning axis, and a turning driver disposed at the turnable base and comprising the second turning axis to turn the arm, the second end of the balancer is mounted on the turnable base, and the first end of the balancer is mounted on the arm.

15. The robot according to claim 14, wherein the second mounting portion is on a side of the turnable base and is disposed at a distal end portion of the turnable base and above the turning driver.

16. The robot according to claim 15, wherein the bolt device comprises a plurality of bolts, and the hole structure comprises a plurality of holes configured to engage with the plurality of bolts respectively.

17. The robot according to claim 14, wherein the bolt device comprises a plurality of bolts, and the hole structure comprises a plurality of holes configured to engage with the plurality of bolts respectively.

18. The robot according to claim 13, wherein the bolt device comprises a plurality of bolts, and the hole structure comprises a plurality of holes configured to engage with the plurality of bolts respectively.

19. The robot according to claim 12, wherein the bolt device comprises a plurality of bolts, and the hole structure comprises a plurality of holes configured to engage with the plurality of bolts respectively.

20. A method for mounting a balancer to a robot, comprising:
mounting a first end of a balancer to a first mounting portion of a robot such that the first end of the balancer is mounted to the robot; and
mounting a second end of the balancer to a second mounting portion of the robot such that the second end of the balancer is mounted to the second mounting portion of the robot in a direction approximately parallel to a longitudinal direction of the balancer,
wherein the robot comprises a robot arm, the balancer comprising a rod and a cylinder such that a fluid in the cylinder urges the rod to contract into the cylinder in the longitudinal direction of the balancer, a first mounting portion mounting the first end of the balancer to the robot arm, and a second mounting portion mounting the second end of the balancer to the robot arm, and the second mounting portion comprises a connection mechanism generating a connection force in a direction approximately parallel to the longitudinal direction of the balancer such that the connection force is urging the rod to expand to a mounted length of the balancer in the longitudinal direction of the balancer.

* * * * *